(12) United States Patent
Li

(10) Patent No.: US 8,275,094 B2
(45) Date of Patent: Sep. 25, 2012

(54) METHOD AND DEVICES FOR PROVIDING WETTING CURRENT

(75) Inventor: Dong Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1309 days.

(21) Appl. No.: 11/691,825

(22) Filed: Mar. 27, 2007

(65) Prior Publication Data

US 2007/0230686 A1 Oct. 4, 2007

(30) Foreign Application Priority Data

Apr. 3, 2006 (CN) .......................... 2006 1 0072913

(51) Int. Cl.
*H04M 1/24* (2006.01)
*H04M 3/08* (2006.01)
*H04M 3/22* (2006.01)
*H04M 9/00* (2006.01)
*H04M 1/00* (2006.01)
(52) U.S. Cl. ................... 379/1.03; 379/1.04; 379/29.03; 379/413; 379/413.02
(58) Field of Classification Search ................ 379/1.01, 379/9, 9.06, 10.01, 15.01, 15.05, 17, 22, 379/22.03, 22.06, 22.07, 23, 24, 26.01, 27.01, 379/27.06, 27.07, 29.01, 29.04, 29.05, 29.08
See application file for complete search history.

(56) References Cited

U.S. PATENT DOCUMENTS

| | | | |
|---|---|---|---|
| 6,246,748 B1 | 6/2001 | Yano | |
| 6,362,909 B1* | 3/2002 | Bedrosian | 398/171 |
| 6,519,253 B1* | 2/2003 | Posthuma | 370/359 |
| 6,560,129 B1* | 5/2003 | Walger | 363/50 |
| 6,647,117 B1* | 11/2003 | Wallace et al. | 379/413 |
| 7,027,587 B2* | 4/2006 | Menasco, Jr. | 379/377 |
| 7,676,031 B2* | 3/2010 | Posthuma | 379/93.28 |
| 7,773,744 B1* | 8/2010 | Joffe | 379/412 |
| 7,787,614 B2* | 8/2010 | Duran et al. | 379/413.02 |
| 8,130,912 B2* | 3/2012 | Zojer et al. | 379/1.04 |

(Continued)

FOREIGN PATENT DOCUMENTS

CN 1411249 A 4/2003

(Continued)

OTHER PUBLICATIONS

European Office Action for Application No. 07251340.1, dated May 2, 2008.

(Continued)

*Primary Examiner* — Binh Tieu
(74) *Attorney, Agent, or Firm* — Conley Rose, P.C.; Grant Rodolph; Rayhao Chung

(57) ABSTRACT

A device, a method and a line testing device connected to a line-capturing matrix for providing wetting current in the communications field are disclosed. Connecting the line-capturing matrix to a wetting current circuit in a network device makes it possible to acquire a wetting current from the wetting current circuit via the line-capturing matrix in the network device. In accordance with embodiments of the invention, one wetting current circuit may provide wetting currents for lines of multiple ports by connecting to a line-capturing matrix in the network device. The wetting current circuit may be a built-in or an independent wetting current circuit. By using the solution provided in the embodiments of the invention, the cost of system hardware may be reduced while the power consumption of the system may be lowered.

16 Claims, 3 Drawing Sheets

U.S. PATENT DOCUMENTS

| | | | |
|---|---|---|---|
| 2004/0161100 A1* | 8/2004 | Menasco, Jr. | 379/377 |
| 2006/0072606 A1* | 4/2006 | Posthuma | 370/463 |
| 2006/0188072 A1* | 8/2006 | Ferianz | 379/22 |
| 2006/0233352 A1* | 10/2006 | Ploumen | 379/399.01 |
| 2007/0116260 A1* | 5/2007 | Sodersjerna et al. | 379/414 |
| 2007/0147591 A1* | 6/2007 | Ploumen et al. | 379/1.03 |
| 2007/0217101 A1* | 9/2007 | Carter et al. | 361/54 |
| 2008/0205631 A1* | 8/2008 | Francheschini et al. | 379/377 |

FOREIGN PATENT DOCUMENTS

| | | |
|---|---|---|
| CN | 1571521 | 1/2005 |
| CN | 1725713 A | 1/2006 |
| CN | 101052068 A | 10/2007 |
| DE | 10 2004 032 210 | 1/2006 |
| DE | 102004032206 A1 | 1/2006 |
| JP | 3-250962 | 11/1991 |
| WO | WO-00/04549 A2 | 1/2000 |
| WO | WO-01/50716 | 7/2001 |
| WO | WO-02/09430 A2 | 1/2002 |
| WO | WO-2006/052288 | 5/2006 |

OTHER PUBLICATIONS

European Office Action for Application No. 07251340.1, dated Jun. 7, 2010.

English-language translation of First Office Action for Chinese Application No. 200780000400.0, dated Apr. 26, 2010.

English-language translation of Written Opinion for Application No. PCT/CN2007/001052, dated Jul. 5, 2007.

Foreign Communication From a Related Counterpart Application, Chinese Application 200780000400.0, Chinese Office Action dated Aug. 15, 2011, 5 pages.

* cited by examiner

METHOD AND DEVICES FOR PROVIDING WETTING CURRENT

CROSS-REFERENCE TO RELATED APPLICATION

The priority benefit of Chinese Patent Application No. 200610072913.X, filed Apr. 3, 2006, the entire disclosure of which is hereby incorporated herein by reference, is claimed.

BACKGROUND OF THE INVENTION

1. Field of the Technology

The invention relates to the communications technology, and in particular, to a method and devices for providing wetting current to subscriber lines.

2. Background of the Invention

In communication networks, multiple metallic lines are needed to connect an exchange or an access network to User Equipment (UE). These connections may include connections between a device and a distribution frame, between an internal-line bar and an external-line bar of distribution frame, between the external-line bar of the distribution frame and a main cable, between the main cable and a cross-connection box, and between a junction box and UE. In such connections, multiple wire splices exist. Since these wire splices are generally exposed in the air, wire splices are inclined to be oxidized with the extension of service time. Severe Oxidation of wire splices may degrade the quality of connection of copper lines and result in degradation of transmission of signals.

In terms of the above problem, a general solution in the field is to continually or intermittently provide a certain Direct Current (DC) loop current, also called wetting current, on lines to protect the wire splices of the lines.

The early Asymmetric Digital Subscriber Line (ADSL) and Very high speed Digital Subscriber Line 2(VDSL2) usually work with the traditional telephone service. With reference to FIG. 1, no wetting current is needed since DC feeding current provided by the traditional voice network device may serve as wetting current. The DC feeding current is provided on copper lines to UE by the general telephone service. When the phone is off-hook, the current may pass copper lines and prevent the wire splices from oxidation, thus no wetting current is needed.

Along with development of network technologies, traditional voice services are provided by ADSL/VDSL2 broadband networks or wireless networks, and many applications in pure broadband mode emerge gradually. In these networks, the traditional telephone service working in DC mode no longer exists. The traditional network device for providing voices may quit services gradually, and the new broadband network device may no longer provide or may provide few traditional voice services. As a result of such a change, operators can lower the fixed asset investment on traditional voice network interfaces, and meanwhile reduce the associated maintenance and operation cost with the decrease of devices. Therefore, due to the absence of traditional voice line cards, no device may provide the DC loop current on lines. In this case, it is urgent to provide wetting current on network devices to meet the requirement of preventing wire splices from oxidation.

However, since the current Single-pair High-bit-rate Digital Subscriber Line (SHDSL) technique works with no DC and uses the 0-4 k band of general voices, a network device is needed to provide DC current to guarantee the reliable connection of wire splices. The wetting current function has been integrated in many network devices for the SHDSL interface. Such a wetting current is generally implemented by building a wetting current circuit in an SHDSL link card.

In order to provide the wetting current for preventing copper lines from rustiness, one solution is to preset a wetting current circuit in a broadband link card of a network device, as shown in FIG. 2. When the traditional network device that provides voices stops working, the wetting current circuit is activated to provide a wetting current on line loops. In this solution, In order to construct the loop of wetting current, the UE-side device is required to be modified properly to construct a wetting current loop.

When using the above solution, the broadband link card in the existing broadband device is first required to be replaced by a new one that has ability to support the function of presetting the wetting current circuit. For building new devices, this solution complicates the construction of a broadband link card and increases cost. In addition, the function of supporting wetting current circuit needs developing for various broadband line cards including SHDSL, ADSL and VDSL, thus leading to relatively higher cost. Furthermore, increased power consumption of the system caused by providing wetting current function is relatively high.

In order to provide the wetting current for preventing copper lines from rustiness, another solution is to provide a wetting current circuit for each line interface in a splitter card to replace the feeding of traditional voice devices. As shown in FIG. 3, when the traditional voice line card of plain old telephone service (POTS) stops working, the corresponding wetting current circuit may be connected to the line via a built-in switch to provide the wetting current to the line.

However, the above solution is unsatisfactory in that, this solution is more applicable to new devices, while the original splitter cards in existing broadband devices have to be replaced by the card that supports wetting current function, which limits the application of this solution. Furthermore, the power consumption of system for providing wetting current is relatively high. 0.3 w of power consumption are needed in normal condition of each line based on an average of 6 mA per line, which will bring such problems as heat dissipation to the network device with large capacity and high density.

SUMMARY OF THE INVENTION

Embodiments of the invention provide a method and devices for providing wetting currents to subscriber lines to make one wetting current circuit provide wetting currents for lines of multiple ports.

A device for providing a wetting current may include:
a line-capturing matrix, for capturing one of subscriber lines; and
a wetting current circuit, for providing a wetting current to the subscriber line captured by the line-capturing matrix.

A splitter card may include:
a line-capturing matrix, for capturing one of subscriber lines; and
a wetting current circuit, for providing a wetting current to the subscriber line captured by the line-capturing matrix.

A method for providing wetting current may include:
capturing one of subscriber lines; and
providing a wetting current for the subscriber line captured.

It can be seen from the solution in accordance with this disclosure that, by connecting the built-in or external wetting current circuit of the network device with the line-capturing matrix, one wetting current circuit may provide wetting currents for lines of multiple ports with low cost, which lowers the cost of system hardware while reducing power consumption of the system.

DETAILED DESCRIPTION OF THE PREFERRED EMBODIMENTS

Embodiments of the invention provide a device, a method and a line testing device connected to a line-capturing matrix for providing wetting current. In the embodiments, wetting current circuits are connected to built-in or external line-capturing matrixes to provide wetting currents for multiple lines by using the ability of the capturing lines of different ports at different moments of the line-capturing matrix.

Figure 1:
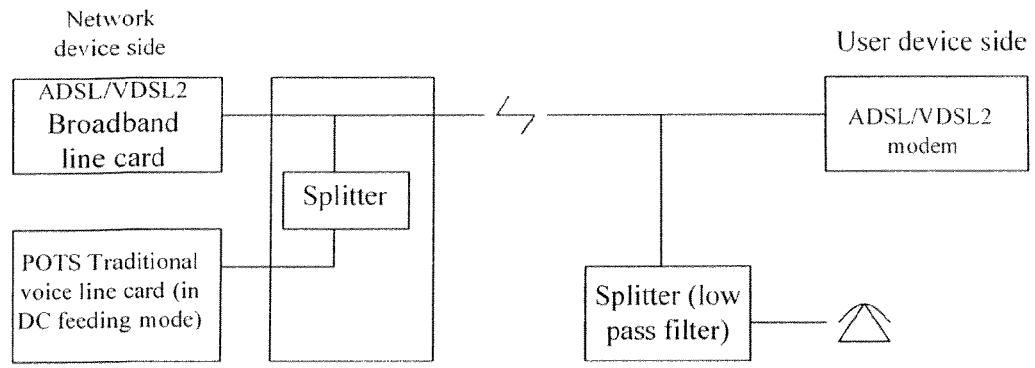
FIG. 1 is a schematic diagram illustrating a network structure of providing wetting current for a network device via a traditional voice line card in the prior art.
Figure 2:
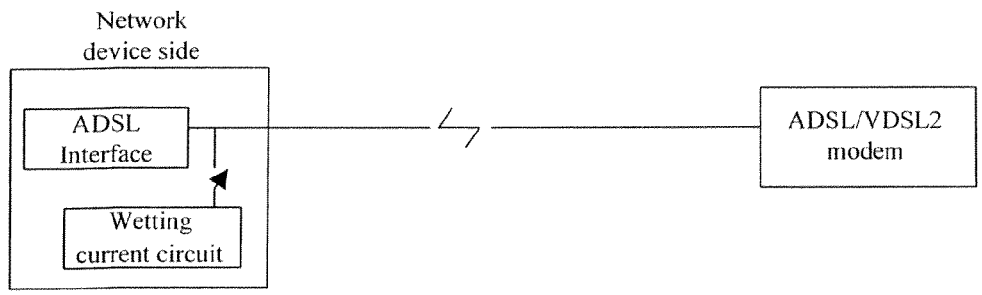
FIG. 2 is a schematic diagram illustrating a network structure of providing wetting current for a network device via a wetting current circuit built in a broadband line card in the prior art.
Figure 3:
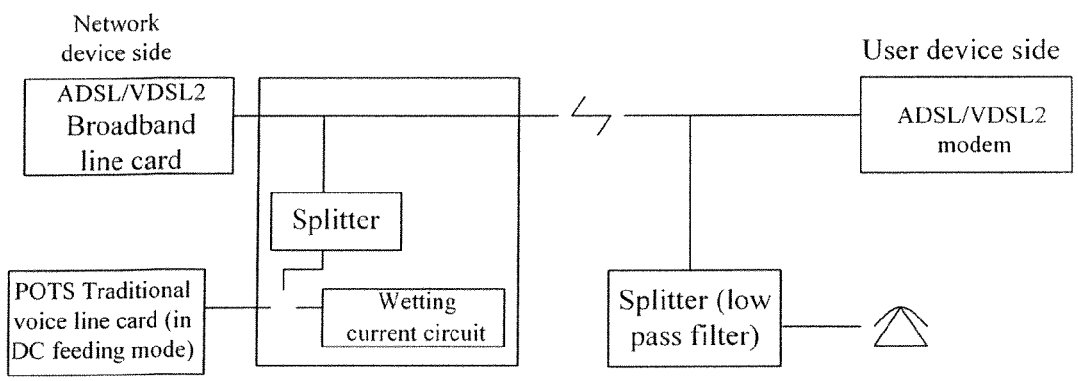
FIG. 3 is a schematic diagram illustrating a network structure of providing wetting current for a network device via a splitter card with a preset wetting current circuit in the prior art.
Figure 4:
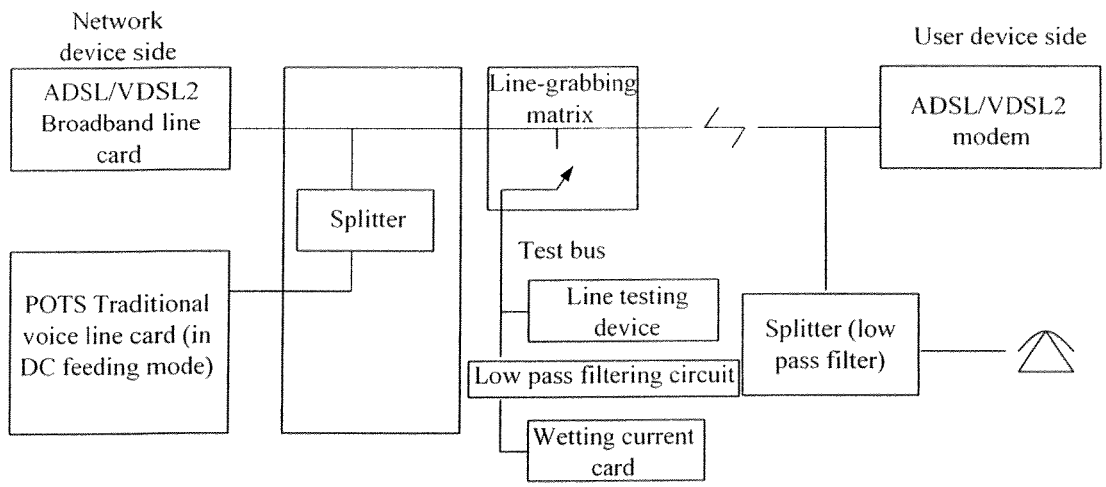
FIG. 4 is a first schematic diagram illustrating a network structure in accordance with embodiment 1 of the device of this disclosure.

The device for providing wetting current according to an embodiment of this invention is illustrated in FIG. 4, which may be used for providing wetting current for a network device in the case of setting a line-capturing matrix in the network device or in the case of independently setting a wetting current circuit when building a new network device. In this embodiment, all the lines connecting ADSL/VDSL2 broadband line cards and/or POTS traditional voice line cards of network device side to the corresponding ADSL/VDSL2 modems and traditional phones pass the line-capturing matrix built outside the network device side. Lines from the POTS traditional voice line card pass a splitter and the line-capturing matrix in order. Before signals reach the traditional phone of the UE side, the splitter performs the low-pass filtering on the signals. In this embodiment, the wetting current circuit is connected to the line-capturing matrix via a test bus. In order to avoid the impact, such as, packet loss or offline, on the normal operation of broadband services when the wetting current circuit is connected to the line, the wetting current circuit is connected to the line-capturing matrix via a circuit with low-pass filtering characteristic. When the line-capturing matrix captures a line of a user port, the wetting current circuit may provide a wetting current for the line. Similarly, when a line of another user is captured, the wetting current circuit may also provide a wetting current for the line captured. The manner and time of capturing a line by the line-capturing matrix may be set in accordance with actual requirements, thus one wetting current circuit is capable of providing wetting currents for multiple ports by capturing lines of different ports at different moments.

The test bus connecting the line-capturing matrix to the wetting current circuit may also connect the line-capturing matrix to the line testing device, that is, the wetting current circuit and the line testing device may share one test bus. The line testing device may be used for testing the lines captured by the line-capturing matrix, for example, testing the capacitance of the line captured, short circuit over the ground and any externally applied voltage. In order to independently control the operation of the wetting current circuit and the line testing device which are sharing one test bus, a control interface may be set to connect the wetting current circuit and the line testing device to a network management device. The network management device may decide to test the line captured or to provide wetting current for the line captured according to actual requirements.

Figure 5:
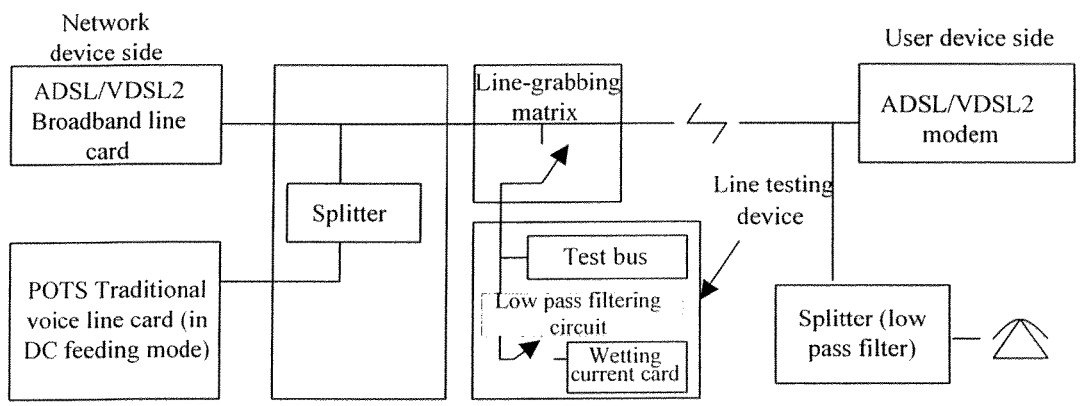
FIG. 5 is a second schematic diagram illustrating a network structure in accordance with a first embodiment of the invention.

As shown in FIG. 5, the wetting current circuit may also be set in the line testing device. In order to avoid bus collision when the wetting current circuit shares the test bus with the line testing device, the wetting current circuit may be connected to the test bus via a controllable switch.

Figure 6:
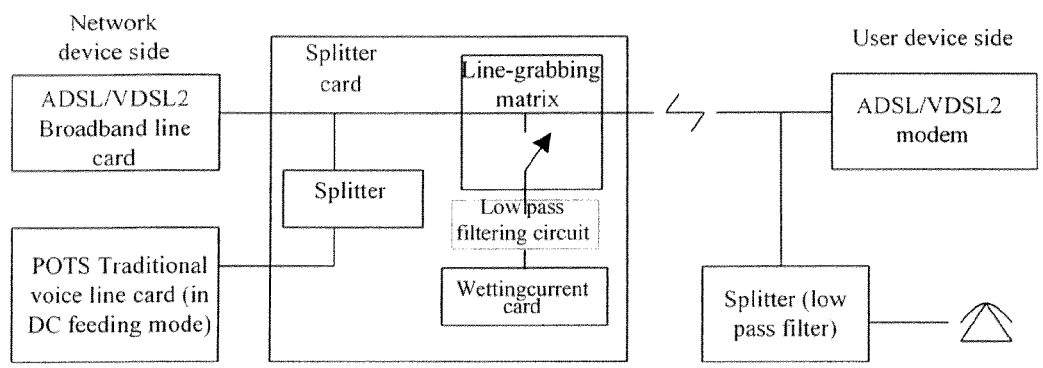
FIG. 6 is a schematic diagram illustrating a network structure in accordance with a second embodiment of the invention.

The device for providing wetting current according to another embodiment of this invention is illustrated in FIG. 6, which may be used for providing wetting current for network devices when a wetting current circuit is set within a splitter card in case of building new network devices. The wetting current circuit is built in the splitter card of network device side and connected to the line-capturing matrix. Also in order to avoid the impact on the normal operation of broadband services when the wetting current circuit is connected to the line, a circuit with low-pass filtering characteristic may be added, and the wetting current circuit is connected to the line-capturing matrix via the circuit with low-pass filtering characteristic. The case that one wetting current circuit may provide wetting currents for lines of multiple ports may be implemented by capturing lines of different ports at different moments, which leads to lower power consumption.

Figure 7:
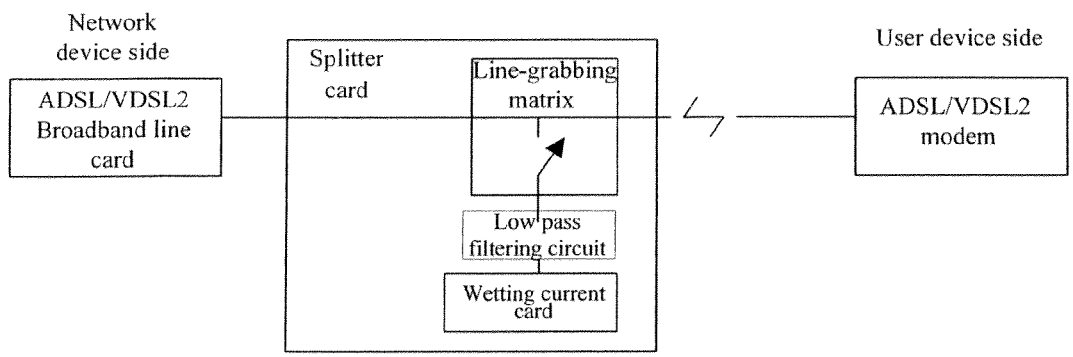
FIG. 7 is a schematic diagram illustrating a network structure in accordance with a third embodiment of the invention.

The device for providing wetting current according to a third embodiment of this invention is illustrated in FIG. 7, which may be used in the case that no POTS traditional voice line card exists in the network system when building new network devices. In this embodiment, a wetting current circuit card is provided in the network device and installed at the network device side. The wetting current circuit card may include a wetting current circuit and a line-capturing matrix connected to the wetting current circuit. Also in order to avoid the impact on the normal operation of broadband services when the wetting current circuit is connected to the line, a circuit with low-pass filtering characteristic may be added, and the wetting current circuit is connected to the line-capturing matrix via the circuit with low-pass filtering characteristic. In this way, one wetting current circuit may provide wetting currents for lines of multiple ports.

A method for providing wetting current in network devices is also disclosed by an embodiment of the invention. The line-capturing matrix first captures lines passing the line-capturing matrix, respectively, at different moments, and the wetting current circuit provides wetting currents for the lines captured. The manner and time of capturing a line by the line-capturing matrix may be set in accordance with actual requirements, thus one wetting current circuit is capable of providing wetting currents for multiple ports by capturing lines of different ports at different moments. The user service may not be interrupted when the line-capturing matrix captures a line to provide a wetting current. As there may be the impact, such as, packet loss or offline, on the normal operation of broadband services when the wetting current circuit is connected to the user line, low-pass filtering of the wetting current signal may be conducted before the wetting current circuit provides a wetting current for the line captured.

As above, in accordance with embodiments of the invention, one wetting current circuit may provide wetting currents for lines of multiple ports by connecting to a line-capturing matrix in the network device. The wetting current circuit may be a built-in or an independent wetting current circuit. By using the solution provided in the embodiments of the invention, the cost of system hardware may be reduced while the power consumption of the system may be lowered.

Though the invention has been illustrated and described by some preferred embodiments, those skilled in the art should understand that various changes may be made in form and detail without departing from the spirit and the scope of the invention and therefore should be covered in the protection scope of the invention defined by the appended claims and its equivalents.

What is claimed is:

1. A system for providing a wetting current in a broadband network comprising:
    an Asymmetric Digital Subscriber Line (ADSL)/Very high speed Digital Subscriber Line (VDSL2) broadband line card configured to communicate with one or more modems via a plurality of subscriber lines, wherein the modems are located in a user side of a broadband network;
    a line-capturing matrix configured to capture a first one of the subscriber lines and a second one of the subscriber lines;
    a wetting current circuit located in a network side of the broadband network and configured to provide a wetting current to the first subscriber line and the second subscriber line,
wherein the first subscriber line and the second subscriber line only provide digital subscriber line (DSL) services; and
    a low-pass filtering circuit comprising of a first end and a second end, wherein the first end is connected to the line-capturing matrix and the second end is connected to the wetting current
    circuit, wherein the line capturing matrix is not directly connected to the wetting current circuit, and wherein the low-pass filtering circuit is configured to perform a low-pass filtering function on the wetting current and send the filtered wetting current over the first subscriber line.

2. A system for providing a wetting current in a broadband network comprising:
    an Asymmetric Digital Subscriber Line (ADSL)/Very high speed Digital Subscriber Line (VDSL2) broadband line card configured to communicate with one or more modems via a plurality of subscriber lines, wherein the modems are located in a user side of a broadband network;
    a line-capturing matrix configured to capture a first one of the subscriber lines and a second one of the subscriber lines;
    a wetting current circuit located in a network side of the broadband network and configured to provide a wetting current to the first subscriber line and the second subscriber line,
wherein the first subscriber line and the second subscriber line only provide digital subscriber line (DSL) services; and
    a line testing device that is connected to the line-capturing matrix and, wherein the line test device is configured to test the first subscriber line and the second subscriber line, wherein the wetting current circuit is not located between the ADSL/VDSL2 broadband line card and the subscriber line, and wherein the wetting current circuit and the line test device share a test bus.

3. The system of claim 2, further comprising a controllable switch comprising a first end and a second end, wherein the first end is connected to the line-capturing matrix, wherein the second end is connected to the wetting current circuit and the line testing device, and wherein the controllable switch is configured to connect the wetting current circuit to the line-capturing matrix and simultaneously disconnect the line testing device from the line-capturing matrix.

4. The system of claim 2, further comprising a controllable switch comprising a first end and a second end, wherein the first end is coupled to the line-capturing matrix, wherein the second end is coupled to the wetting current circuit and the line testing device, and wherein the controllable switch is configured to connect the line testing device to the line-capturing matrix and simultaneously disconnect the wetting current circuit from the line-capturing matrix.

5. The system of claim 2, wherein the line-capturing matrix is connected to the ADSL/VDSL2 broadband line card, and wherein the line-capturing matrix is located in the network side of the broadband network.

6. A system for providing a wetting current in a broadband network comprising:
    an Asymmetric Digital Subscriber Line (ADSL)/Very high speed Digital Subscriber Line (VDSL2) broadband line card configured to communicate with one or more modems via a plurality of subscriber lines, wherein the modems are located in a user side of a broadband network;
    a line-capturing matrix configured to capture a first one of the subscriber lines and a second one of the subscriber lines; and
    a wetting current circuit located in a network side of the broadband network and configured to provide a wetting current to the first subscriber line and the second subscriber line,
wherein the first subscriber line and the second subscriber line only provide digital subscriber line (DSL) services; and
    a splitter card comprising:
        the line-grabbing matrix;
        the wetting current circuit;
        a splitter comprising a first end and a second end, wherein the first end is connected to the subscriber line, and wherein the second end is connected to a plain old telephone service (POTS); and
        a low-pass filtering circuit comprising a first end and a second end, wherein the first end is connected to the line-capturing matrix, and wherein the second end is connected to the wetting current circuit.

7. A network device configured to:
    capture a first subscriber line that provides only digital subscriber line (DSL) services;
    provide a wetting current over the first subscriber line;
    capture a second subscriber line that provides only DSL services;
    provide the wetting current over the second subscriber line; and
    perform a low pass filtering function on the wetting current and send the filtered wetting current over the first subscriber line and the second subscriber line,
    wherein the network device is located on the network side of the broadband network.

8. The network device of claim 7, further configured to test the first subscriber line and the second subscriber line.

9. The network device of claim 8, further configured to test for capacitance of the first subscriber line and the second subscriber line.

10. The network device of claim 8, further, configured to test for short circuits over the ground for the first subscriber line and the second subscriber line.

11. The network device of claim 7, further configured to either test the first subscriber line or provide the wetting current to the first subscriber line, but not both at the same time.

12. A splitter card in a broadband network comprising: a line-capturing matrix configured to capture a first one of a plurality of subscriber lines and a second one of the plurality of subscriber lines, wherein the subscriber lines are used by an Asymmetric Digital Subscriber Line (ADSL)/Very high speed Digital Subscriber Line (VDSL2) broadband line card to communicate with one or more modems located in a user side of the broadband network;
   a wetting current circuit configured to provide a wetting current to the first subscriber line and the second subscriber line; and
   a low-pass filtering circuit configured to perform a low-pass filtering function on the wetting current and subsequently, send the wetting current over the first subscriber line and the second subscriber line,
   wherein the first subscriber line and the second provider line only provides digital subscriber line (DSL) services, and
   wherein the splitter card is located in a network side of the broadband network.

13. The splitter card of claim 12, wherein the line-capturing matrix is connected to the broadband line card, wherein the wetting current circuit is not located between the ADSL/VDSL2 broadband line card and the subscriber line.

14. A method for providing a wetting current in a broadband network, the method comprising:
   capturing a first one of a plurality of subscriber lines used by an Asymmetric Digital Subscriber Line (ADSL)/Very high speed Digital Subscriber Line (VDSL2) broadband line card to communicate with one or more modems located in a user side of the broadband network;
   sending, by a wetting current circuit, the wetting current over the first subscriber line;
   capturing a second one of the plurality of subscriber lines; and
   sending, by a wetting current circuit, the wetting current over the second subscriber line,
   wherein the first subscriber line and the second subscriber line only provides digital subscriber line (DSL) services,
   wherein the wetting current circuit is located in a network side of the broadband network, and
   wherein a low-pass filtering function is performed on the wetting current before sending the wetting current over the first subscriber line and the second subscriber line.

15. The method of claim 14, wherein capturing the first subscriber line and capturing the second subscriber line are not simultaneous.

16. The method of claim 14, wherein the capturing of the subscriber lines are done at the network side of the broadband network.

* * * * *